United States Patent
Sharma et al.

(10) Patent No.: US 11,200,587 B2
(45) Date of Patent: Dec. 14, 2021

(54) FACILITATING USE OF SELECT HYPER-LOCAL DATA SETS FOR IMPROVED MODELING

(71) Applicant: INTERNATIONAL BUSINESS MACHINES CORPORATION, Armonk, NY (US)

(72) Inventors: Puneet Sharma, Bangalore Karnata (IN); Rajesh Phillips, Bangalore (IN); Rajendra Rao, Los Gatos, CA (US); Manisha Sharma Kohli, Subhash Nagar (IN); Vijay Ekambaram, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

(21) Appl. No.: 16/536,719

(22) Filed: Aug. 9, 2019

(65) Prior Publication Data
US 2021/0042771 A1   Feb. 11, 2021

(51) Int. Cl.
*G06Q 30/02*   (2012.01)
*G06F 16/23*   (2019.01)
(Continued)

(52) U.S. Cl.
CPC ..... *G06Q 30/0205* (2013.01); *G06F 11/3608* (2013.01); *G06F 16/2365* (2019.01); *G06N 20/00* (2019.01); *G06Q 10/067* (2013.01)

(58) Field of Classification Search
CPC .............. G06Q 30/0205; G06Q 10/067; G06F 16/2365; G06F 11/3608; G06N 20/00
See application file for complete search history.

(56) References Cited

U.S. PATENT DOCUMENTS 6,703,934 B1   3/2004 Nijman et al.
7,330,839 B2   2/2008 Srinivasan et al.
(Continued)

FOREIGN PATENT DOCUMENTS

WO   2008092149 A2   7/2008

OTHER PUBLICATIONS

"Spatiotemporal event forecasting from incomplete hyper-local price data", X Zhang, L Zhao, AP Boedihardjo, CT Lu . . . —Proceedings of the . . . , 2017—dl.acm.org (Year: 2017).*
(Continued)

*Primary Examiner* — Jonathan G Sterrett
(74) *Attorney, Agent, or Firm* — Cantor Colburn LLP; Steven Bouknight (57) ABSTRACT

Methods, systems and computer program products for facilitating use of select hyper-local data sets for improved modeling are provided. Aspects include receiving customer data associated with a customer by a workbench platform and determining an accuracy of a customer model using the customer data. For each of a plurality of hyper-local data sets, aspects also include determining an increase in model accuracy based on use of the hyper-local data set and the customer data. Aspects include identifying at least one group of hyper-local data sets of the plurality of hyper-local data sets that result in similar increases in model accuracy. Aspects also include facilitating use of a selected one or more of the hyper-local data sets of the at least one group of hyper-local data sets in generating an improved accuracy customer model.

10 Claims, 7 Drawing Sheets

(51) Int. Cl.
*G06N 20/00* (2019.01)
*G06Q 10/06* (2012.01)
*G06F 11/36* (2006.01)

(56) References Cited

U.S. PATENT DOCUMENTS

| | | | | |
|---|---|---|---|---|
| 7,398,270 | B1* | 7/2008 | Choi | G06F 16/35 |
| 7,743,001 | B1 | 6/2010 | Vermeulen et al. | |
| 8,005,697 | B1 | 8/2011 | Cohen et al. | |
| 10,032,180 | B1* | 7/2018 | Shariff | G06Q 10/04 |
| 10,706,439 | B1* | 7/2020 | Lerner | G06N 20/20 |
| 2004/0107205 | A1* | 6/2004 | Burdick | G06F 16/215 |
| 2008/0154798 | A1 | 6/2008 | Valz | |
| 2008/0319829 | A1* | 12/2008 | Hunt | G06Q 30/0201 |
| | | | | 705/7.29 |
| 2009/0228397 | A1 | 9/2009 | Tawakol et al. | |
| 2012/0046996 | A1 | 2/2012 | Shah et al. | |
| 2013/0066682 | A1* | 3/2013 | Godshalk | G06Q 10/067 |
| | | | | 705/7.34 |
| 2014/0129293 | A1* | 5/2014 | Chang | G06F 16/2228 |
| | | | | 705/7.34 |
| 2014/0200962 | A1* | 7/2014 | Godshalk | G06Q 50/16 |
| | | | | 705/7.34 |
| 2014/0200963 | A1* | 7/2014 | Abhyanker | H04W 4/021 |
| | | | | 705/7.34 |
| 2014/0222507 | A1* | 8/2014 | Kilger | G06Q 30/0204 |
| | | | | 705/7.31 |
| 2014/0278454 | A1 | 9/2014 | Peled | |
| 2015/0112767 | A1* | 4/2015 | Shatzkamer | G06Q 30/0205 |
| | | | | 705/7.34 |
| 2015/0262208 | A1* | 9/2015 | Bjontegard | G06Q 30/0202 |
| | | | | 705/7.31 |
| 2015/0317659 | A1 | 11/2015 | Nayak et al. | |
| 2016/0275401 | A1* | 9/2016 | Cao | G06N 20/00 |
| 2017/0033834 | A1* | 2/2017 | Gross | H04B 3/52 |
| 2019/0066133 | A1 | 2/2019 | Cotton | |
| 2019/0102819 | A1* | 4/2019 | Bilotta | G06Q 30/0623 |

OTHER PUBLICATIONS

CORALS: Who Are My Potential New Customers? Tapping into the Wisdom of Customers' Decisions R Li, JY Jiang, CJT Ju, W Wang—. . . Conference on Web Search and Data . . . , 2019—dl.acm.org (Year: 2019).*

IBM MetroPulse, retrieved from https://www-03.ibm.com > software > sla > sladb.nsf, 2018 (Year: 2018).*

Wikipedia, "Semantic smilarity," Wikipedia.org; URL: https://en.wikipedia.org/wiki/Semantic_similarity; Retrieved on Jul. 31, 2019; 9 pages.

* cited by examiner

FACILITATING USE OF SELECT HYPER-LOCAL DATA SETS FOR IMPROVED MODELING

BACKGROUND

The present invention generally relates to processing systems, and more specifically, to facilitating use of select of hyper-local data sets for improved modeling.

Workbench software platforms provide users with the capability to generate models based on client data (i.e., data provided by the user) and common data sources such as hyper-local data sources. For example, native multi-dimensional hyper-local data sources may include neighborhood profiles, seasonal factors, shopper demographics, social influences, brand affinity, purchase trends and other such data that may be provided on a granular, local level. Client-side data-scientists can feed in their data sources into a workbench software platform and use the software platform's capabilities to build predictive models that fuse the client data together with the native hyper-local data. Such workbench software platforms commonly do not allow such confidential native hyper-local data to be copied by the client outside of the sandbox provided by the platform. Workbench software platforms can also provide access to third-party hyper-local data sets that may be purchased by a client to augment the data used in model generation, which can result in the creation of more accurate models.

SUMMARY

Embodiments of the present invention are directed to facilitating use of select hyper-local data sets for improved modeling. A non-limiting example computer-implemented method includes receiving customer data associated with a customer by a workbench platform. The method also includes determining an accuracy of a customer model using the customer data. The method also includes for each of a plurality of hyper-local data sets, determining an increase in model accuracy based on use of the hyper-local data set and the customer data. The method also includes identifying at least one group of hyper-local data sets of the plurality of hyper-local data sets that result in similar increases in model accuracy. The method also includes facilitating use of a select one or more of the hyper-local data sets of the at least one group of hyper-local data sets in generating an improved accuracy customer model.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide facilitation of use of select hyper-local data sets (e.g., via an auction) for improved modeling in a workbench software platform. A workbench software platform can be a platform, such as for example, IBM's Metropulse Analytics Workbench, which provides a "sandbox" for a customer to generate customer models based on user-submitted customer data and hyper-local data sources that are provided via the workbench software platform. As will be understood by those of skill in the art, such models can be machine learning models that can have various use cases, such as for example, predicting future sales revenues at a given store location, predicting future sales of particular items at a particular location (for use in determining item inventories), and determining item inventories based on predicted future sales of particular items at particular locations, and determining where to place one or more new stores within a locality to optimize sales. Hyper-local data can be data that is specific to a very localized area that may be of interest to a business or other organization. For example, hyper-local data may include data about the behaviors (e.g., purchasing habits, foot traffic, etc.) of consumers within a city and/or other local conditions (e.g., weather patterns, traffic data, points of interest, etc.), within one or more blocks of a city, or within a predetermined local area (e.g., an area within a 1,000 meter radius of a point). It will be understood that hyper-local data may encompass localities that can be defined at different and/or overlapping levels of granularity. Some hyper-local data sources can be collected and/or access by the workbench software platform via publicly available sources (e.g., United States census data), whereas other hyper-local data sources may be proprietary to the workbench software platform or to third parties. Hyper-local data sources can include neighborhood profiles, seasonal factors, shopper demographics, social influences, brand affinity, purchase trends localized at a fine granular level and other such types of localized data. Proprietary hyper-local data sets can typically be purchased by a customer for use in generating a model via the workbench software platform, which can result in the creation of a more accurate customer model than would otherwise be created with it. The workbench software platform can prevent copying or exporting hyper-local data outside of the sandbox by the customer, thereby protecting proprietary data while providing customers with the ability to leverage workbench resources to enable fast modeling and easy fusion of hyper-local data with the customer's native data.

One or more embodiments of the present invention can test the effect that use of one or more hyper-local data sets in training a model would have on the accuracy of a given customer model and then facilitate an auction of the hyper-local data sets for purchase by the customer. This is advantageous because it can help the customer identify which hyper-local data sets may provide increases in accuracy to their model and what the comparative increase in accuracy would be, to allow a user to better select which hyper-local data sets to use in creating a customer model. It can be further advantageous to the owners of the proprietary hyper-local data sets because it can allow the owners to compete over the customer's business and to sell the use of a hyper-local data set that the customer might have otherwise not purchased based on a fixed-pricing scheme. The system can facilitate an efficient marketplace for hyper-local data sets, by for example, grouping hyper-local data sets that provide similar increases in model accuracy to a customer model and facilitating auctions based on each such group of hyper-local data sets. According to some embodiments of the invention, the system can thus facilitate the purchase and use of third party hyper-local data sets prior to even providing the user with direct access to the data, thereby protecting the proprietary data from being used by the customer without being purchased while also allowing the customer to understand the value of what they are purchasing before the purchase is made.

One or more embodiments of the present invention address one or more of the shortcomings of the prior art by providing the owners of hyper-local data sets and/or the customer with an indication of the impact of the combination of the hyper-local data set with the customer data in terms of improved accuracy of the customer model, so that each may determine how to evaluate the value of hyper-local data set. Such impacts to the accuracy of the model can be determined while protecting the hyper-local data sets from export or even from viewing by the customer, thereby ensuring the security of confidential hyper-local data sets. Further, according to some embodiments, purchase of hyper-local data can be implemented automatically on the customer's behalf based on one or more quality metrics that can be user-specified. In this way, embodiments of the present invention can enable automatic generation of improved customer models using appropriately selected hyper-local data sets that are acquired for a competitive value.

Figure 1:
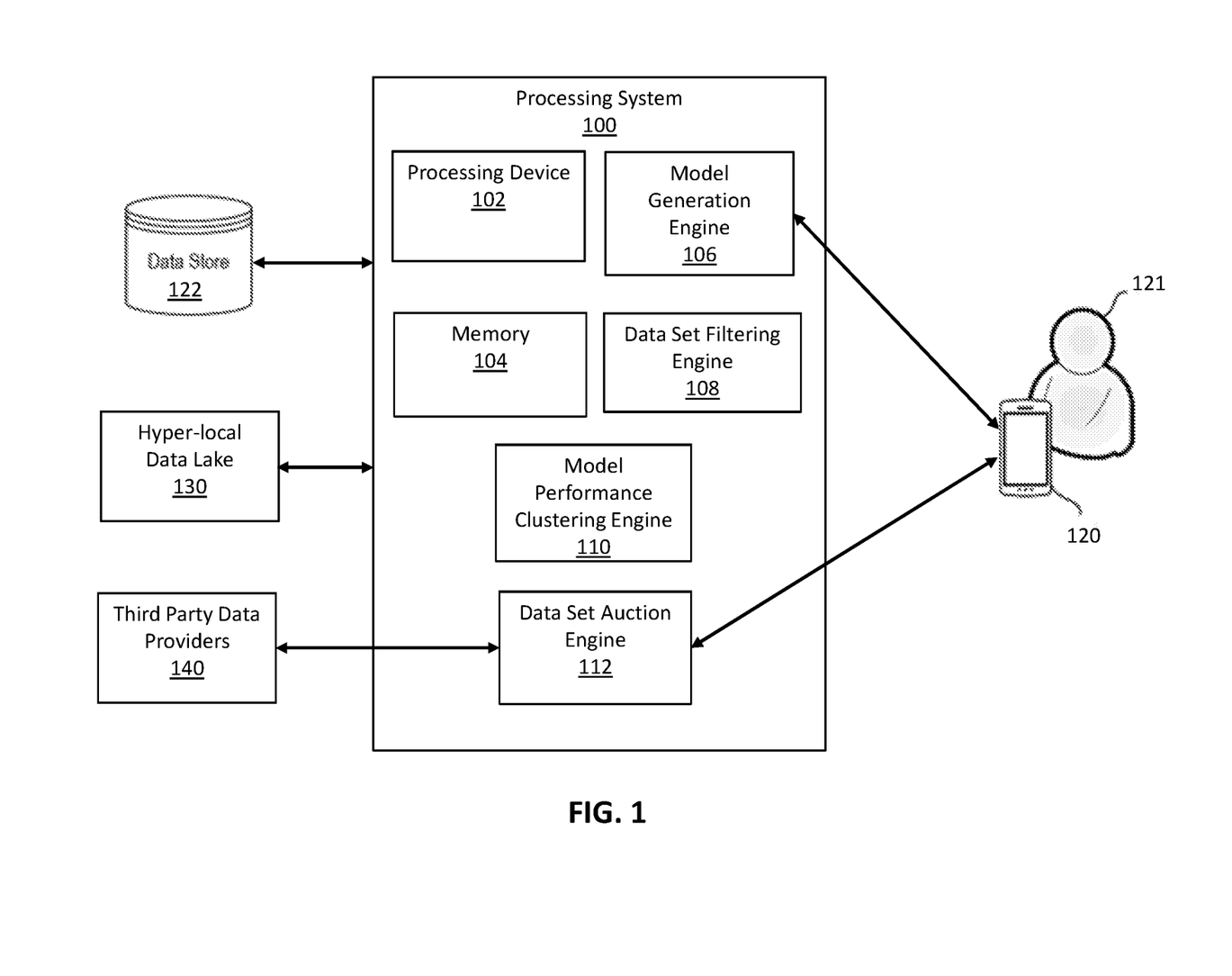
FIG. 1 illustrates a block diagram of components of a processing system for facilitating use of select hyper-local data sets for improved modeling in accordance with one or more embodiments of the present invention.

Turning now to FIG. 1, a system 100 for facilitating an auction of hyper-local data sets for improved modeling is generally shown in accordance with one or more embodiments of the present invention. The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., memory 104) can store program instructions that when executed by the processing device 102 implement the engines described herein. Other engines can also be utilized to include other features and functionality described in other examples herein.

The processing system 100 includes the processing device 102, the memory 104, a model generation engine 106, a data set filtering engine 108, a model performance clustering engine 110 and a data set auction engine 112. According to some embodiments, processing system 100 may be a workbench software platform. The processing system 100 can be configured to communicate with a user device 120, which may display data to and receive user inputs from a user 121. In some embodiments, user device 120 may be used to transmit customer data to the processing system 100. In some embodiments, customer data can include one or more of sales data, product inventory data, vendor locations, and other such data relating to customer operations within a locality. According to some embodiments, the processing system 100 may communicate with user device 120, data store 122, hyper-local data lake 130 and third-party data providers 140 via communications network that may be one or more of, or a combination of, public (e.g., Internet), private (e.g., local area network, wide area network, virtual private network), and may include wireless and wireline transmission systems (e.g., satellite, cellular network, terrestrial networks, etc.). In exemplary embodiments, user devices 120 can include, but are not limited to, a desktop computer, a laptop, a tablet, a smartphone, a wearable device such as a smartwatch, an augmented reality headset, a tablet, a smart speaker, a television, a computer system such as the one shown in FIG. 7, or any other suitable electronic device. The processing system may store and access data via a connected data store 122, and may also access and use hyper-local data provided via the hyper-local data lake 130 and/or third party data providers 140. According to some embodiments, hyper-local data may be data that corresponds to a location or a locality, such as a city, a street, a corner block, a store, a neighborhood, a specific location on a map, or any other feasible granularity of location-associated data that may be collected and/or stored as part of the hyper-local data lake 130 or otherwise accessed via third-party data providers 140 (e.g., via third-party data servers or other devices that store hyper-local data owned by the third party). For example, in various embodiments, hyper-local data may be data that pertains to an area that is approximately 1,000 square meters, 2,500 square meters, 5,000 square meters, 10,000 square meters, or any other size of area or areas as may be appropriate to cover one or more localities that may be of interest to a business or other organization seeking to make data-driven decisions. In some embodiments, hyper-local data lake 130 may be a set of databases in a workbench software platform where the hyperlocal data is stored. According to some embodiments, third-party hyper-local data sets may be stored in hyper-local data lake 130 and/or remotely stored by third-party data providers 140. According to some embodiments, third-party hyper-local data may also be stored in data store 122.

The model generation engine 106 allows a user to build and train predictive models in relation to specified use-cases that fuse user-provided client data with hyper-local data sources made available by the processing system 100, for example, via the hyper-local data lake 130 and/or third party data providers 140. As will be appreciated by those of skill in the art, predictive models may include for example, models that predict sales of products and services in various locations or models that determine how to distribute sales resources such as the locations of vending machines. The model generation engine 106 may be configured to allow a user to specify a desired granularity of location-based information (e.g., how many stores to put in a city vs. how many kiosks to put on a street). The granularity of location-based data can be managed using geo-hashing, which is a technique that can divide the world into high, medium and low-level data (e.g., state vs. city vs. street). Features may similarly be broken into different levels of granularity (e.g., the average income in the state vs. average income in a city vs. average income on a given street. Generally, model generation engine 106 may train a model (e.g., using machine learning techniques) based on user-submitted client data, a description of a use-case and hyper-local data sources and one or more features.

According to some embodiments of the invention, model generation engine 106 can determine a base level of accuracy of a customer model based on customer data received from the customer 121. According to some embodiments, the customer data received by the model generation engine 106 from the customer 121 can include both historical input data (e.g., contributing factors such as product price) and historical output data (e.g., results/metrics that are desirable to predict, such as sales numbers) and the model generation engine 106 can be configured to build a customer model based on the customer data. However, in some embodiments, the customer data may only include historical output data (e.g., sales numbers with dates), in which case the customer data alone may be insufficient for the model generation engine 106 to generate a customer model. In this case, the model generation engine 106 may utilize one or more hyper-local data sources in creating the customer model. In both cases, further hyper-local data sources can then be used to potentially increase the accuracy of the customer model. According to some embodiments, the base level of accuracy of the customer model can be determined by splitting the customer data into a first portion of customer data used for training the customer model and a second portion of customer data used to test the model. According to some embodiments, model generation engine 106 may use approximately 80% of the customer data to train a model and approximately 20% of the customer data to test the model. Thus, for example, if the customer data is five years of sales data associated with a particular locality, the model generation engine 106 may use the first four years of sales data to train a customer model and then may use the model to make predictions about a theoretical fifth year of sales, and then compare the predicted fifth year of sales against the actual fifth year of sales data to determine how accurate the model is. According to some embodiments, the accuracy can be represented as a percentage of average difference between the predicted data and the actual test data. Thus, improvements to the accuracy of the customer model may be measured as a percentage improvement to the base level accuracy. Thus, for example, if the average predictions of the initial customer model differ from the actual test data by 20%, but the introduction of a given hyper-local data source improves that to an average difference of 15% then the hyper-local data source may be said to have increased the accuracy of the original customer model by 25%. It should be understood that the preceding description of model accuracy measurements is merely exemplary and other methods and/or metrics of measuring model accuracy or improvement to model accuracy may be used.

Figure 2:
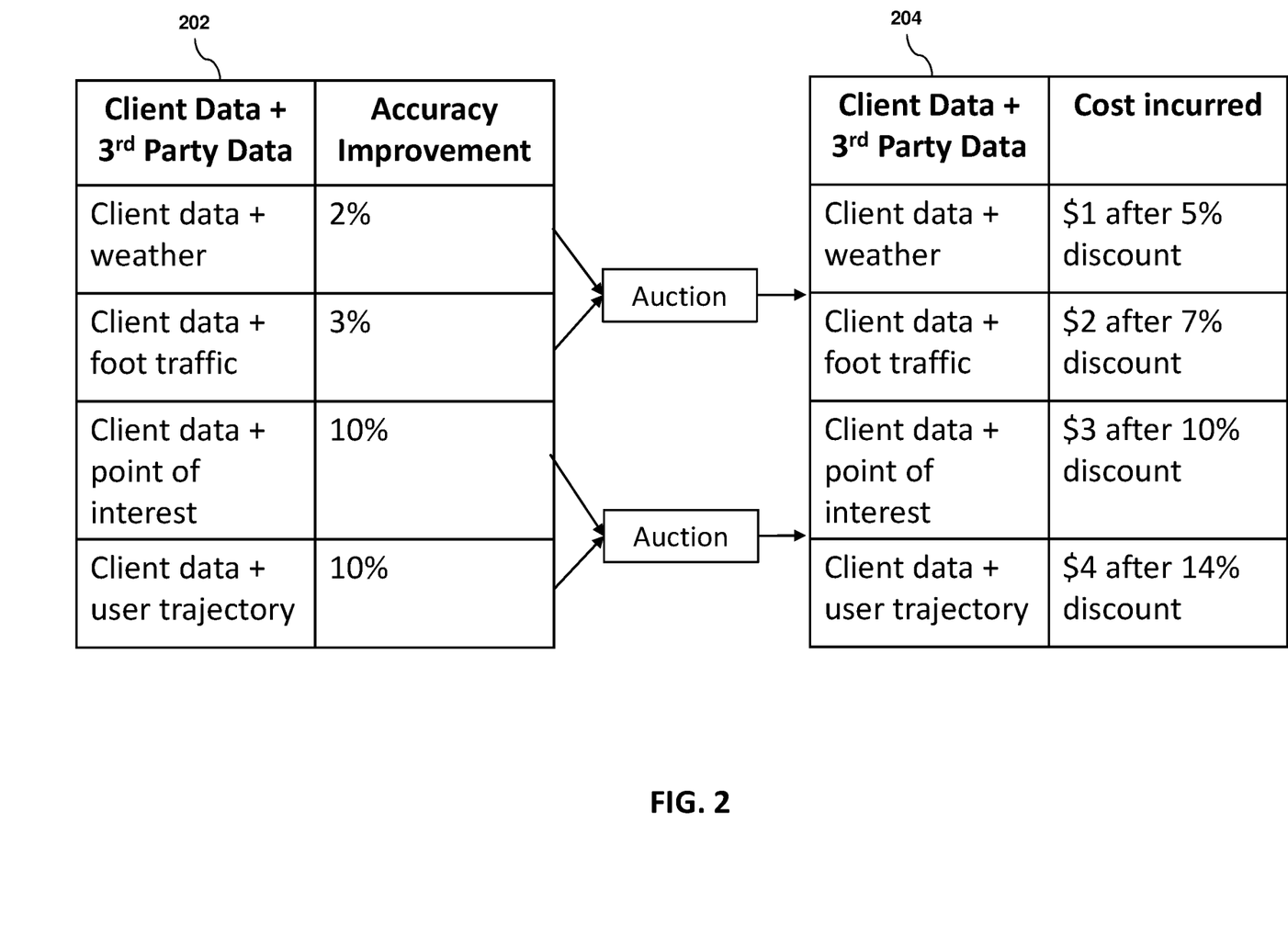
FIG. 2 illustrates an example of facilitating use of select hyper-local data sets for improved modeling in accordance with one or more embodiments of the present invention.

The model generation engine 106 can also train one or more test models using a portion of the customer data in combination with one or more hyper-local data sets. For example, a first test model could be trained based on a first portion of the customer data in combination with a first hyper-local data set, a second test model can be trained based on the first portion of the customer data in combination with a second hyper-local data set, and so on. Further, in some embodiments of the invention, test models can be created or trained by model generation engine 106 based on a portion of the customer data in combination with more than one hyper-local data set. Further, the model generation engine 106 can be configured to test each test model against the second portion of customer data that was used as test data when testing the initial customer model and determine any increase in accuracy as described above. FIG. 2 illustrates an example first table 202 providing an example of various test models and their corresponding increases in accuracy. First table 202 shows a first test model that has been trained using client data (i.e., customer data) in combination with a first hyper-local data source of weather data, which, when compared to the initial customer model, shows an increase in accuracy of 2%. A second test model that was trained with client data and a second hyper-local data set of foot traffic data shows an accuracy increase of 3%. A third test model that was trained with client data and a third hyper-local data set of point of interest data shows an accuracy increase of 10% and a fourth test model that was trained with client data and a fourth hyper-local data set of user trajectory also shows an accuracy increase of 10%. As will be described further below, these various hyper-local data sets can be grouped based on their levels of accuracy improvement and auctioned against one another.

The data set filtering engine 108 can be configured to filter all of the available hyper-local data sets to eliminate irrelevant hyper-local data sets for a given customer model based on location data associated with the customer data and the hyper-local data sets. For example, the data set filtering engine 108 can determine that the customer data received from the customer only relates to a particular city, neighborhood or other locality and then may filter all available hyper-local data sets to eliminate hyper-local data sets that are not associated with the locality of the customer data set from consideration for use with the customer data set. In other words, the data set filtering engine 108 can identify a plurality of hyper-local data sets (from all available sets of hyper-local data) that may potentially be useful (i.e., generate an increase in model accuracy) when used to train a model in combination with the customer data. Thus, for example, if the client data referred to in FIG. 2 relates to Washington D.C., then the data set filtering engine 108 can have filtered all of the hyper-local data sets available via the workbench software platform (e.g., that are available from any of data store 122, hyper-local data lake 130 and third-party data providers 140) such that the only hyper-local data sets that are used by the system to create test models are hyper-local data sets that relate to Washington D.C. Therefore, in this example, each of the weather, foot traffic, point of interest and user trajectory hyper-local data sets shown in FIG. 2 would represent data that relates to Washington D.C. only.

The model performance clustering engine 110 can cluster groups of hyper-local data sets together based on the accuracy improvement to the initial customer model shown by using each hyper-local data set in a test model. According to some embodiments, the groups can be formed by using clustering techniques. In some embodiments, the groups can be formed by placing each hyper-local data set into a "bucket" corresponding to a predetermined range of accuracy improvement scores. For example, in some embodiments, the buckets could be 1-5%, 6-10%, 15-20%, 20-25%, and so on. According to some embodiments, only the hyper-local data sets corresponding to test models may be first ranked in order of the greatest improvement to accuracy to the least and the model performance engine 110 may only select up to a predetermined number of the highest accuracy improvement scores to place into groups while discarding the rest from consideration. In some embodiments, the model performance clustering engine 110 may discard hyper-local data sets from consideration that do not have at least a predetermined minimum level of accuracy improvement. FIG. 2 shows an example of grouping of hyper-local data sets based on accuracy improvement. As shown, the weather hyper-local data set is grouped with the foot traffic hyper-local data set, which have similar levels of accuracy improvement (i.e., 2% and 3%, respectively) and the point of interest hyper-local data set and the user trajectory hyper-local data set are grouped together as they have identical accuracy improvement scores (i.e., 10%). According to some embodiments of the invention, once groups of hyper-local data sets have been formed, the system may facilitate an auction based on the groups as described below. Although the preceding description refers to forming groups based on the similarity of accuracy improvement, according to some embodiments of the invention, groups may be formed based on other factors or combinations of factors. For example, in some embodiments of the invention, groups can be formed based on the similarity between features or semantic similarity of other metadata of data sets (e.g., use of "user trajectory" vs. "foot traffic" could lead to similar inferences when semantically compared and understood, as could "spending power" vs. "salary/income", and "derived population" (population of small area derived from population of bigger area) vs. "exact population"). As will be appreciated by those of skill in the art, semantic similarity of terms can be determined using one or more methods that are known in the art by defining a topological similarity and using ontologies to define the distance between terms/concepts.

The data set auction engine 112 can automatically facilitate an auction of the hyper-local data sets of one or more groups identified by the model performance clustering engine 110. As each of the hyper-local data sets within a group have been determined to be similar to one another in terms of their effect on the accuracy of the customer model, the grouping provides an approximate "apples to apples" comparison. For instance, as shown in the example in FIG. 2, a customer can achieve roughly the same improvement to their model if they utilize the data weather hyper-local data set as they would if they used the foot traffic hyper-local data set. Likewise, the customer would achieve the same improvement to their model if they used either of the point of interest hyper-local data set or the user trajectory hyper-local data set, but much greater improvements than if either is compared to the weather or foot traffic hyper-local data sets. According to some embodiments of the invention, the data set auction engine 112 can contact the respective owners of each hyper-local data set (e.g., via electronic contact to third-party data providers 140) at issue and allow them to submit an asking price for the purchase of their respective hyper-local data sets for use in the customer's model. In some embodiments of the invention, the data set auction engine 112 may provide given owner information about the accuracy improvement provided by their hyper-local data set as well as the competing hyper-local data sets in the group. For instance, in the example shown in FIG. 2, the data set auction engine 112 may notify the owner of the foot traffic hyper-local data set that their data may increase the customer model accuracy by 3%, but there is an alternative (i.e., the weather hyper-local data set) that provides a 2% increase and thus the owner of the foot traffic hyper-local data will likely want to take the alternative into account when setting a price for the foot traffic hyper-local data. According to some embodiments, the data set auction engine 112 may provide a transparent bidding system that allows competing owners to view offered asking prices for the competing data sets, which may allow for bidding wars to occur. For instance, as shown in the second table 204 in FIG. 2, in this example the owner of the weather hyper-local data set is offering a sales price of "$1 after a 5% discount" for the sale of the weather hyper-local data set for use in the customer's model and the owner of the foot traffic hyper-local data set is offering a sales price of "$2 after a 7% discount" (e.g., representing a cost of data unit following a percentage discount on the listed price of data) for the sale of the foot traffic hyper-local data for use in the customer's model. According to some embodiments, a given auction may last for a predetermined amount of time and the owners may revise their offer price until the predetermined amount of time has expired. In some embodiments, the data set auction engine 112 may provide a blind auction that prevents an owner from seeing the offered asking prices of competing data sets. As will be appreciated by those of skill in the art, many types of automated auction processes are known in the art and any such process may be utilized by data set auction engine 112.

In some embodiments of the invention, the data set auction engine 112 may provide the asking prices offered by the owners of the hyper-local data sets to the customer (e.g., via user device 120) to allow the user to make a selection of one or more hyper-local data sets to purchase for use in generating a new customer model that has improved accuracy. According to some embodiments of the invention, data set auction engine 112 can be configured to automatically select and purchase one or more hyper-local data sets based on the offered prices and one or more quality metrics that may be optionally input in advance by a customer. For example, the quality metrics may specify that the cheapest offer should be accepted or alternatively that the best value offer should be accepted. Quality metrics may specify improvement minimums (i.e., only purchase hyper-local data sets that provide a predetermined minimum level of accuracy increase) cost maximums, or other such constraints. According to some embodiments of the invention, once purchased, the model generation engine may automatically train a new customer model having improved accuracy using the purchased hyper-local data set(s) and the customer data as training data. In some embodiments, the entirety of the customer data may be used as part of the training data when generating the new customer model.

According to some embodiments, the data set auction engine 112 may be configured to generate a suggested auction price for a given hyper-local data set based on the probability of winning the bid. For example, over time the processing system 100 may gather and store the outcomes of various auction processes and based on this data can generate a prediction of a confidence level for which a given customer will purchase a given hyper-local data set at a given price in view of the alternative hyper-local data sets that are available. For example, the system may predict there is a 50% chance that the customer will buy the data set at the current auction price, but if the owner lowers the price 10 cents it will increase to a 55% chance, but if the owner lowers the price 20 cents it will increase to an 85% chance. Accordingly, in some embodiments, the data set auction engine 112 may be configured to provide suggestions or guidance to one or more hyper-local data set owners in setting pricing for the sale of hyper-local data sets.

Figure 3:
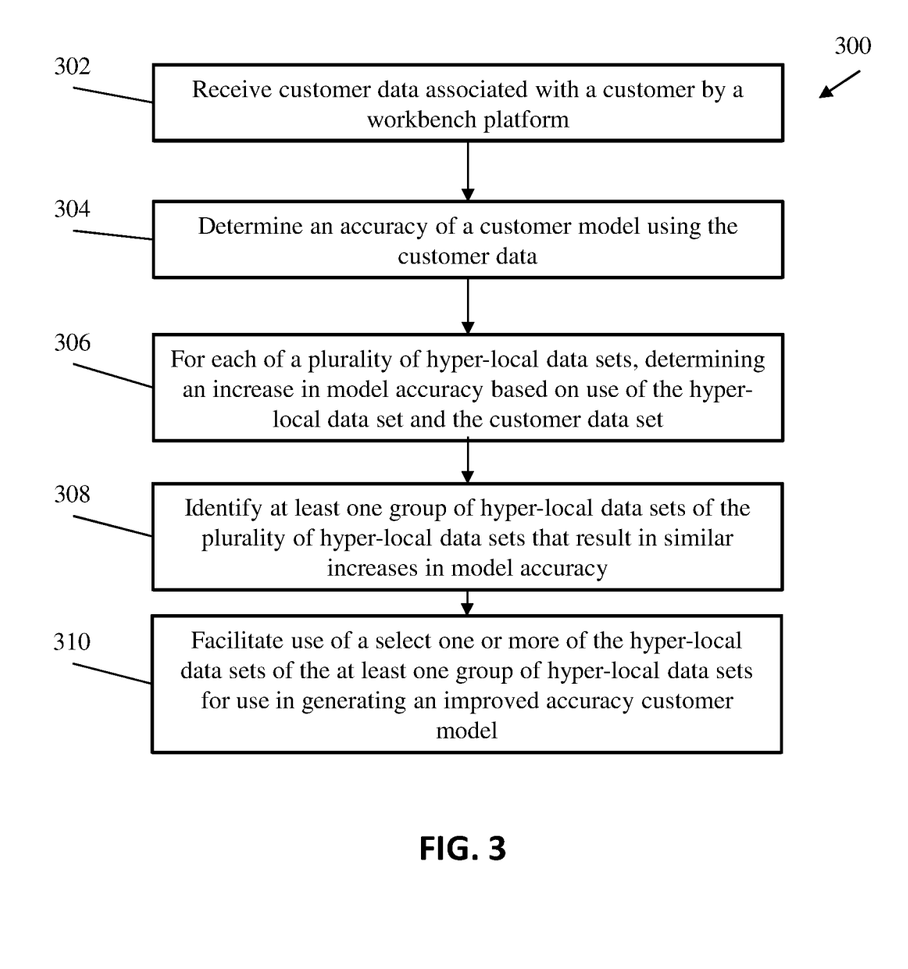
FIG. 3 illustrates a flow diagram of a process for facilitating use of select hyper-local data sets for improved modeling in accordance with one or more embodiments of the present invention.

Turning now to FIG. 3, a flow diagram of a method 300 for facilitating an use of select hyper-local data sets for improved modeling in accordance with an embodiment is shown. According to some embodiments of the invention, facilitation of use of select hyper-local data sets for improved modeling may include facilitating an auction of the one or more hyper-local data sets for use in generating an improved customer model. In one or more embodiments of the present invention, the method 300 may be embodied in software that is executed by computer elements located within a network that may reside in the cloud, such as the cloud computing environment 50 described herein above and illustrated in FIGS. 5 and 6. In other embodiments, the computer elements may reside on a computer system or processing system, such as the processing system 700 described herein above and illustrated in FIG. 7, or in some other type of computing or processing environment.

The method 300 begins at block 302 and includes receiving (e.g., via processing system 100) customer data associated with a customer by a workbench platform. According to some embodiments, the workbench platform prevents export or copying of any hyper-local data set by the customer. In some embodiments of the invention, the workbench platform can prevent a customer from viewing or otherwise accessing one or more third party or otherwise proprietary hyper-local data sets prior to purchasing the data set for use in the customer's model As shown at block 304, the method includes determining (e.g., via processing system 100) an accuracy of a customer model using the customer data. According to some embodiments, the customer model can be a machine learning model that is generated using a first portion of the customer data as training data. In some embodiments, determining the accuracy of the customer model using the customer data may include testing the customer model using a second portion of the customer data as testing data and determining how accurate the customer model is in predicting results associated with the testing data. For example, as explained previously above, in some embodiments of the invention, the system may use 80% of the customer data to train a customer model and the other 20% of the customer data to test the model and determine the accuracy of the initial model.

As shown at block 306, the method includes for each of a plurality of hyper-local data sets, determining (e.g., via processing system 100) an increase in model accuracy based on use of the hyper-local data set and the customer data. According to some embodiments, determining an increase in model accuracy based on use of the hyper-local data set and the customer data set can include generating a test model using the first portion of the customer data and the hyper-local data set as training data, testing the test model using the second portion of the customer data as testing data, determining how accurate the test model is in predicting results associated with the testing data, and comparing an accuracy of the test model to the accuracy of the customer model to determine a difference in model accuracy. In other words, according to some embodiments of the invention, the system may generate a number of test models, where each test model corresponds to the use of at least one of the plurality of hyper-local data sources in training the test model. Each test model can then be tested against the test data (i.e., the second portion of the customer data) and the system can compare the accuracy of each test model to the accuracy of the original customer model to determine an amount of increase of accuracy to the original customer model achieved in association with each test model and the corresponding one or more hyper-local data sets.

As shown at block 308, the method includes identifying (e.g., via processing system 100) at least one group of hyper-local data sets of the plurality of hyper-local data sets that result in similar increases in model accuracy. In some embodiments, identifying at least one group of hyper-local data sets of the plurality of hyper-local data sets that result in similar increases in model accuracy can include clustering the plurality of hyper-local data sets based on similarity of the difference in model accuracy as described previously above.

As shown at block 310, the method includes facilitating (e.g., via processing system 100) use of a select one or more of the hyper-local data sets of the at least one group of hyper-local data sets for generating an improved accuracy customer model. In some embodiments, facilitating use of a select one or more of the hyper-local data sets of the at least one group of hyper-local data sets in generating an improved accuracy customer model can include notifying an owner of a first hyper-local data set of the at least one group of hyper-local data sets of the difference in model accuracy associated with the first hyper-local data set, notifying the owner of the difference in model accuracy associated with one or more second hyper-local data sets of the at least one group of hyper-local data sets that are associated with one or more other owners and receiving an offer from the owner. The offer represents a price of the first hyper-local data set that is offered for sale to the customer. In other words, the owner of a given hyper-local data set of the group can be informed as to what value their data set adds to the customer's model and also be informed as to what value the competing hyper-local data sets add to the customer's model to allow the owner to make an informed decision when setting an asking price. According to some embodiments, the facilitation of use of a select one or more of the hyper-local data sets of the at least one group of hyper-local data sets can include facilitating an auction of the select one or more of the hyper-local data sets as described herein.

According to some embodiments, facilitating use of a select one or more of the hyper-local data sets of the at least one group of hyper-local data setscan include providing, to the customer, one or more offers associated with one or more corresponding hyper-local data sets of the at least one group of hyper-local data sets and receiving, from the customer, an acceptance of one of the one or more of the offers. In some embodiments, facilitating the use of a select one or more of the hyper-local data sets can include automatically accepting on behalf of the customer, one of a lowest price offer or a best value offer associated with a hyper-local data set of the at least one group of hyper-local data sets. For example, as described previously above, the system can be configured to automatically accept one or more offers to purchase hyperlocal data sets for use in the customer model based on predetermined quality metrics stored by the system.

According to some embodiments, the method 300 may further include identifying a location associated with the customer data and filtering all hyper-local data sets accessible by the workbench platform by the location associated with the customer data to generate the plurality of hyper-local data sets. In other words, prior to generating test models, the system may identify, which of the available hyper-local data sets may be relevant to the customer data based on the location associated with the data, and may eliminate all other hyper-local data sets from consideration. This can allow the system to preserve resources and only generate test models that are likely to provide an increase in accuracy to the customer model.

Figure 4:
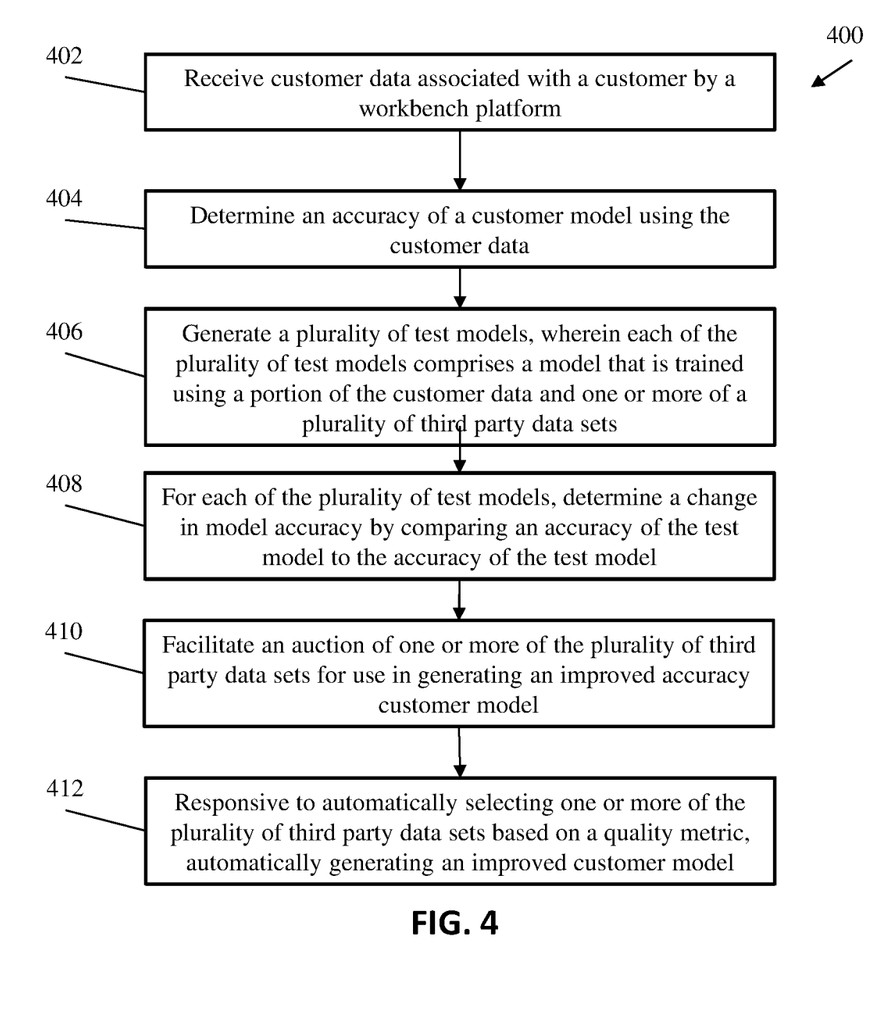
FIG. 4 illustrates a flow diagram of a process for facilitating an auction of hyper-local data sets for improved modeling in accordance with one or more embodiments of the present invention.

Turning now to FIG. 4, a flow diagram of another method 400 for facilitating an auction of hyper-local data sets for improved modeling in accordance with an embodiment is shown. In one or more embodiments of the present invention, the method 400 may be embodied in software that is executed by computer elements located within a network that may reside in the cloud, such as the cloud computing environment 50 described herein above and illustrated in FIGS. 5 and 6. In other embodiments, the computer elements may reside on a computer system or processing system, such as the processing system 700 described herein above and illustrated in FIG. 7, or in some other type of computing or processing environment.

The method 400 begins at block 402 and includes receiving (e.g., via processing system 100) customer data associated with a customer by a workbench platform in a manner similar to that described above with respect to block 302.

As shown at block 404, the method includes determining (e.g., via processing system 100) an accuracy of a customer model using the customer data in a manner similar to that described above with respect to block 304.

As shown at block 406, the method includes generating (e.g., via processing system 100) a plurality of test models, wherein each of the plurality of test models comprises a model that is trained using a portion of the customer data and one or more of a plurality of third-party data sets. According to some embodiments, the system may generate a number of test models that correspond to every possible combination of data sets with the portion of the customer data set (labeled "C"). For example, if there are three $3^{rd}$ party data sets (labeled "1", "2", and "3"), the system may generate test models corresponding to: C+1, C+2, C+3, C+1+2, C+1+3, C+2+3 and C+1+2+3. Thus, any large improvement to model accuracy that may be gained by the synergistic combination of multiple data sets can be captured and taken advantage of for greater model value and accuracy.

As shown at block 408, the method includes for each of the plurality of test models, determining (e.g., via processing system 100) an increase in model accuracy by comparing an accuracy of the test model to the accuracy of the customer model in a manner similar to that described above with respect to block 306.

As shown at block 410, the method includes facilitating (e.g., via processing system 100) an auction of one or more of the plurality of third party data sets for use in generating an improved accuracy customer model. According to some embodiments of the invention, if two or more hyper-local data sets that were used in a given test model are owned by different owners, the system may enable each owner to set a price on their respective hyper-local data sets and may provide an aggregate offer for the two or more hyper-local data sets by adding the offers together. According to some embodiments of the invention, the system may restrict test the selection of multiple hyper-local data sets used in the creation of a given test model to being owned by the same owner to avoid hybrid bids. For instance, in the example described previously, if data sets 1 and 2 are owned by a first owner and data set 3 is owned by a different second owner, then the system may prevent test models from being generated that are based on a combination of data set 3 with either of data sets 1 or 2.

As shown at block 412, the method includes automatically generating (e.g., via processing system 100) an improved customer model in response to automatically selecting one or more of the plurality of third party data sets based on a quality metric. According to some embodiments, a quality metric may be a user-selected or user-input indication of the selection criteria for accepting one or more offers of third party data sets for use in model generation. For example, a quality metric may specify that the user desires to purchase the cheapest data set yielding a minimum accuracy improvement. In some embodiments, a quality metric may specify that the user desires to purchase the best value data set(s) (i.e., dollar per percentage increase in accuracy), possibly subject to a user-specified a minimum level of accuracy increase or maximum cost per increase in accuracy. As will be appreciated by those of skill in the art, in various embodiments, a user may specify various different constraints or combinations of constraints (e.g., minimum increases in accuracy, maximum costs, etc.) that can determine which of the one or more third-party data sets are purchased and used in generating the improved customer model.

Additional processes may also be included. It should be understood that the processes depicted in FIGS. 3 and 4 represent illustrations, and that other processes may be added or existing processes may be removed, modified, or rearranged without departing from the scope and spirit of the present disclosure.

Figure 5:
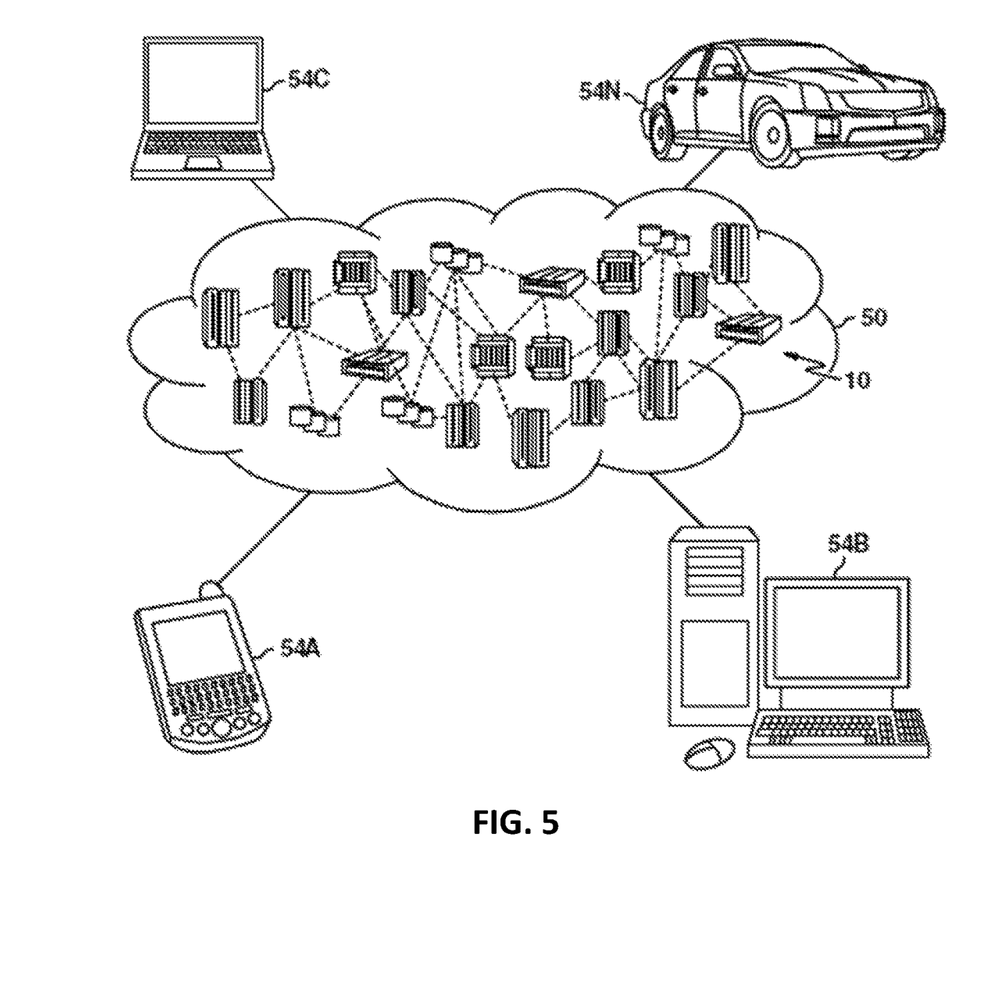
FIG. 5 illustrates a cloud computing environment according to one or more embodiments of the present invention.
Figure 6:
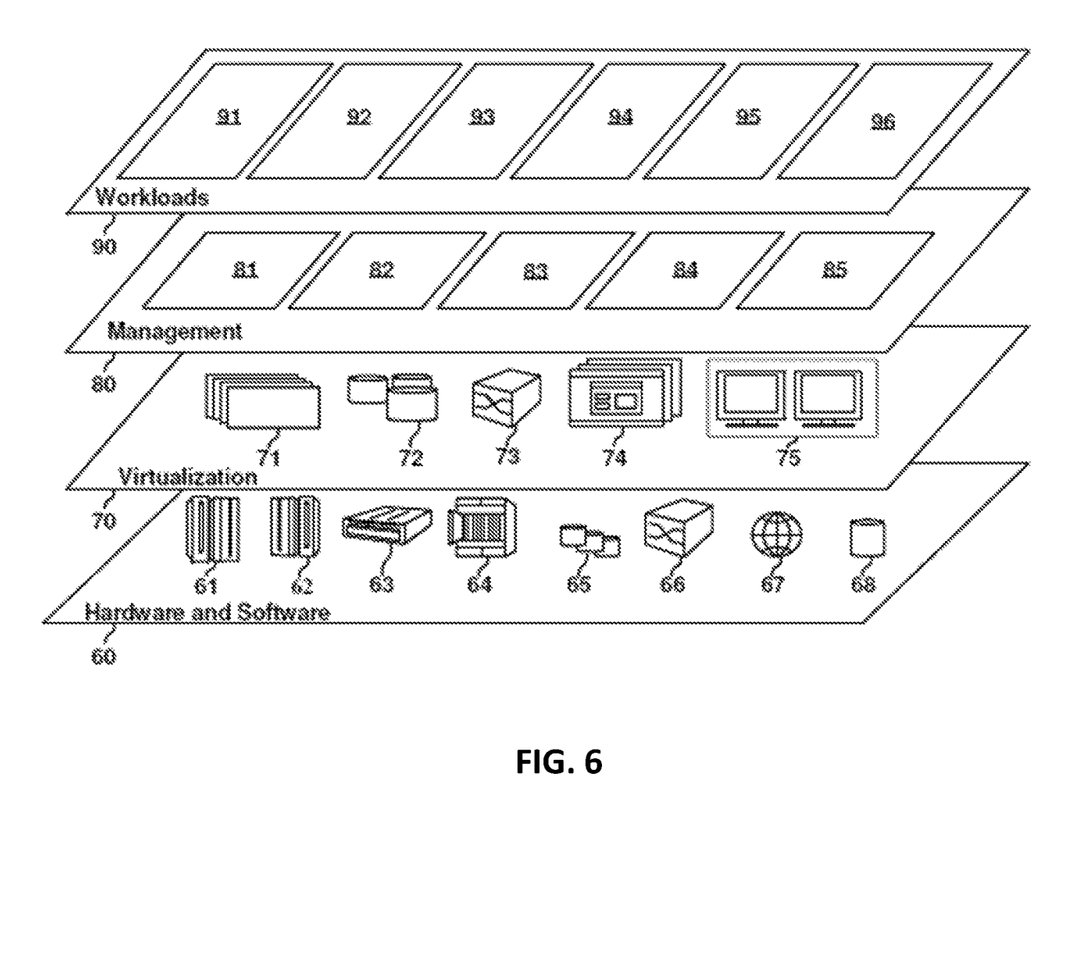
FIG. 6 illustrates abstraction model layers according to one or more embodiments of the present invention.

FIG. 5 depicts a cloud computing environment according to one or more embodiments of the present invention. FIG. 6 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (S3S): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (P3S): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (I3S): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facilitating use of select hyper-local data sets for improved modeling 96.

Figure 7:
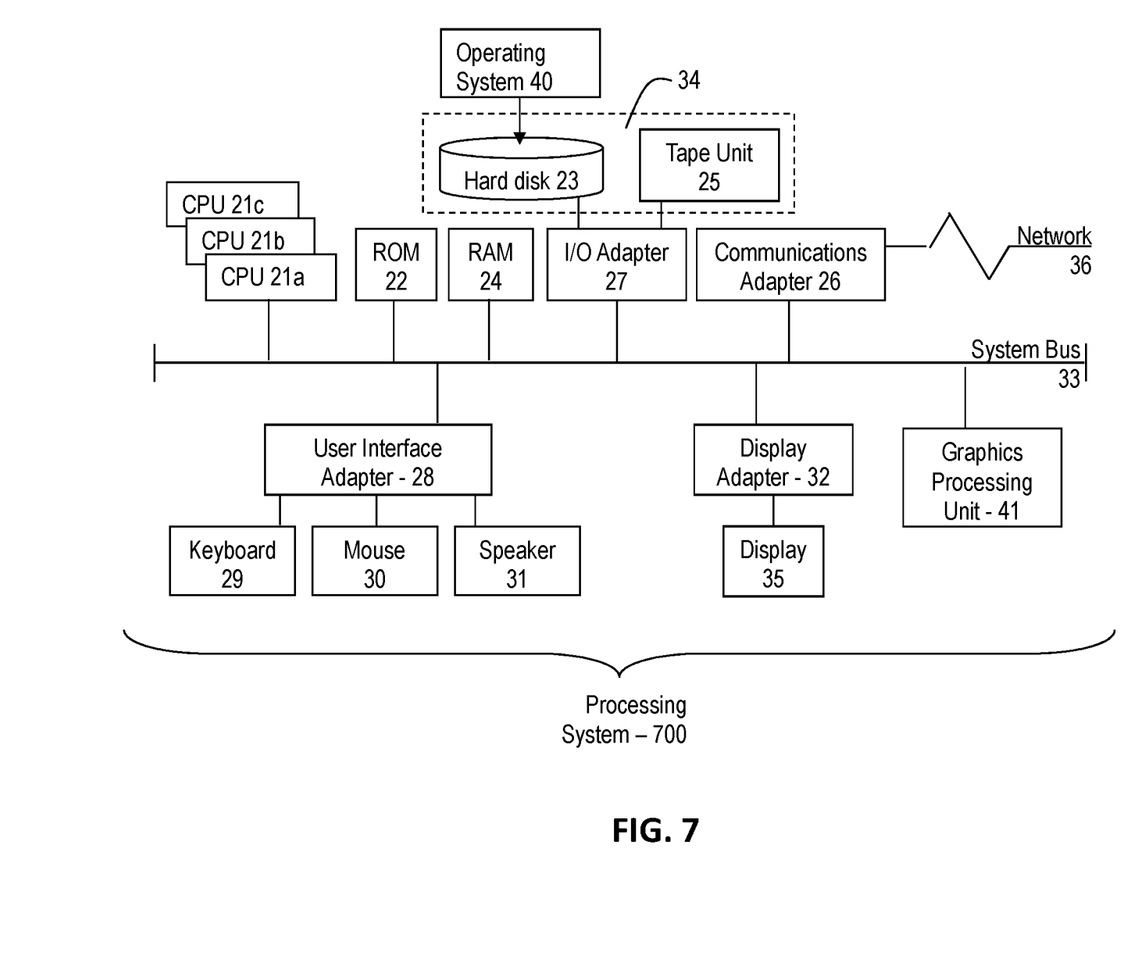
FIG. 7 illustrates a block diagram of a computer system for use in implementing one or more embodiments of the present invention.

FIG. 7 depicts a processing system for implementing one or more embodiments of the present invention. It is understood that one or more embodiments of the present invention are capable of being implemented in conjunction with any other type of computing environment now known or later developed. For example, FIG. 7 depicts a block diagram of a processing system 700 for implementing the techniques described herein. In accordance with one or more embodiments of the present invention, system 700 is an example of a cloud computing node 10 of FIG. 5. In the embodiment shown in FIG. 7, processing system 700 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 700.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 700 can be stored in mass storage 34. The RAM 24, ROM 22, and mass storage 34 are examples of memory 19 of the processing system 700. A network adapter 26 interconnects system bus 33 with an outside network 36 enabling the processing system 700 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 700 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 700 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, by a workbench platform, customer data associated with a customer;
    determining, using the customer data, an accuracy of a customer model by training the customer model against a first portion of the customer data and testing the customer model using a second portion of the customer data to determine how accurate the customer model is in predicting results;
    identifying a location associated with the customer data;
    filtering all data sets accessible by the workbench platform by the location to generate a plurality of hyper-local data sets, wherein a hyper-local data set is a data set that comprises data specific to a predetermined radius of the location;
    for each of the plurality of hyper-local data sets, determining an increase in model accuracy attributed to a supplemental use of the respective hyper-local data set with the customer data as additional training data, wherein determining the increase in model accuracy comprises:
        training the customer model against the first portion of the customer data and the respective hyper-local data set; and
        testing the customer model using the second portion of the customer data to determine how accurate the customer model is in predicting results when supplemented with the respective hyper-local data set;
    clustering at least one group of hyper-local data sets of the plurality of hyper-local data sets into one or more buckets corresponding to a predetermined range of accuracy improvement; and
    for each bucket, facilitating use of a select one or more of the hyper-local data sets of the at least one group of hyper-local data sets in generating an improved accuracy customer model.

2. The computer-implemented method of claim 1, wherein the customer model comprises a machine learning model that is generated using the first portion of the customer data as training data.

3. The computer-implemented method of claim 1, wherein facilitating use of a select one or more of the hyper-local data sets of the at least one group of hyper-local data sets comprises:
    notifying an owner of a first hyper-local data set of the at least one group of hyper-local data sets of the difference in model accuracy associated with the first hyper-local data set;
    notifying the owner of the difference in model accuracy associated with one or more second hyper-local data sets of the at least one group of hyper-local data sets that are associated with one or more other owners; and
    receiving an offer from the owner, wherein the offer represents a price of the first hyper-local data set that is offered for sale to the customer.

4. The computer-implemented method of claim 1, wherein the workbench platform prevents export or copying of any hyper-local data set by the customer.

5. The computer-implemented method of claim 1, wherein facilitating use of a select one or more of the hyper-local data sets of the at least one group of hyper-local data sets comprises:
    providing, to the customer, one or more offers associated with one or more corresponding hyper-local data sets of the at least one group of hyper-local data sets; and
    receiving, from the customer, an acceptance of one of the one or more of the offers.

6. The computer-implemented method of claim 1, wherein facilitating use of a select one or more of the hyper-local data sets of the at least one group of hyper-local data sets comprises automatically accepting on behalf of the customer, one of a lowest price offer or a best value offer associated with a hyper-local data set of the at least one group of hyper-local data sets.

7. A system comprising:
a memory having computer readable instructions; and
one or more processors for executing the computer readable instructions, the computer readable instructions controlling the one or more processors to perform operations comprising:
receiving, by a workbench platform, customer data associated with a customer;
determining, using the customer data, an accuracy of a customer model by training the customer model against a first portion of the customer data and testing the customer model using a second portion of the customer data to determine how accurate the customer model is in predicting results;
identifying a location associated with the customer data;
filtering all data sets accessible by the workbench platform by the location to generate a plurality of hyper-local data sets, wherein a hyper-local data set is a data set that comprises data specific to a predetermined radius of the location;
for each of the plurality of hyper-local data sets, determining an increase in model accuracy attributed to a supplemental use of the respective hyper-local data set with the customer data as additional training data, wherein determining the increase in model accuracy comprises:
training the customer model against the first portion of the customer data and the respective hyper-local data set; and
testing the customer model using the second portion of the customer data to determine how accurate the customer model is in predicting results when supplemented with the respective hyper-local data set;
clustering at least one group of hyper-local data sets of the plurality of hyper-local data sets into one or more buckets corresponding to a predetermined range of accuracy improvement; and
for each bucket, facilitating use of a select one or more of the hyper-local data sets of the at least one group of hyper-local data sets in generating an improved accuracy customer model.

8. The system of claim 7, wherein the customer model comprises a machine learning model that is generated using the first portion of the customer data as training data.

9. A computer program product comprising a computer readable storage medium having program instructions embodied therewith, the program instructions executable by a computer processor to cause the computer processor to perform a method comprising:
receiving, by a workbench platform, customer data associated with a customer;
determining, using the customer data, an accuracy of a customer model by training the customer model against a first portion of the customer data and testing the customer model using a second portion of the customer data to determine how accurate the customer model is in predicting results;
identifying a location associated with the customer data;
filtering all data sets accessible by the workbench platform by the location to generate a plurality of hyper-local data sets, wherein a hyper-local data set is a data set that comprises data specific to a predetermined radius of the location;
for each of the plurality of hyper-local data sets, determining an increase in model accuracy attributed to a supplemental use of the respective hyper-local data set with the customer data as additional training data, wherein determining the increase in model accuracy comprises:
training the customer model against the first portion of the customer data and the respective hyper-local data set; and
testing the customer model using the second portion of the customer data to determine how accurate the customer model is in predicting results when supplemented with the respective hyper-local data set;
clustering at least one group of hyper-local data sets of the plurality of hyper-local data sets into one or more buckets corresponding to a predetermined range of accuracy improvement; and
for each bucket, facilitating use of a select one or more of the hyper-local data sets of the at least one group of hyper-local data sets in generating an improved accuracy customer model.

10. The computer program product of claim 9, wherein the customer model comprises a machine learning model that is generated using the first portion of the customer data as training data.

* * * * *